(12) United States Patent
Zang et al.

(10) Patent No.: US 8,423,047 B1
(45) Date of Patent: Apr. 16, 2013

(54) STATISTICAL METHOD FOR DETERMINING THE LOCATION OF A MOBILE DEVICE

(75) Inventors: Hui Zang, Cupertino, CA (US); Jean C. Bolot, Mountain View, CA (US); Francois Baccelli, Meudon (FR)

(73) Assignee: Sprint Communications Company L.P., Overland Park, KS (US)

(*) Notice: Subject to any disclaimer, the term of this patent is extended or adjusted under 35 U.S.C. 154(b) by 143 days.

(21) Appl. No.: 13/047,346

(22) Filed: Mar. 14, 2011

Related U.S. Application Data

(60) Provisional application No. 61/450,910, filed on Mar. 9, 2011.

(51) Int. Cl.
*H04W 24/00* (2009.01)

(52) U.S. Cl.
USPC ............. 455/456.3; 455/456.1; 455/456.2; 455/456.4; 455/456.5; 455/456.6; 455/443; 455/452.2; 370/332; 370/328; 370/339

(58) Field of Classification Search .... 455/456.1–456.6, 455/443, 452.2; 370/332, 328, 339
See application file for complete search history.

(56) References Cited

U.S. PATENT DOCUMENTS

| | | | |
|---|---|---|---|
| 2004/0127230 A1* | 7/2004 | Bevan et al. | 455/456.5 |
| 2006/0194593 A1* | 8/2006 | Drabeck et al. | 455/456.5 |
| 2007/0099633 A1* | 5/2007 | Bamberger et al. | 455/456.2 |

OTHER PUBLICATIONS

Zang, et al., "Bayesian Inference for Localization in Cellular Networks," 9 pages, Mar. 15, 2010.
Bolot, et al., "Mobility Patterns of Cell Phone Users," 12 pages.
U.S. Appl. No. 61/158,492, filed Mar. 9, 2009; 21 pages.

* cited by examiner

*Primary Examiner* — Wayne Cai
*Assistant Examiner* — Chuck Huynh

(57) ABSTRACT

An embodiment of the current invention is directed to facilitating a location-based service for use by a given mobile-device. A location of each of a number of base stations that makes up a portion of a wireless-telecommunications-network is identified. For a given base station, the probability that it provides a level of signal coverage to a geographical area that would enable the mobile-device in the first geographical area to communicate with the network is determined. A density of possible locations that the mobile-device may be within the geographical area is determined. A position for the mobile-device is approximated based on the density. A location-based service is facilitated for use by the mobile-device based on the position of the mobile-device.

10 Claims, 6 Drawing Sheets

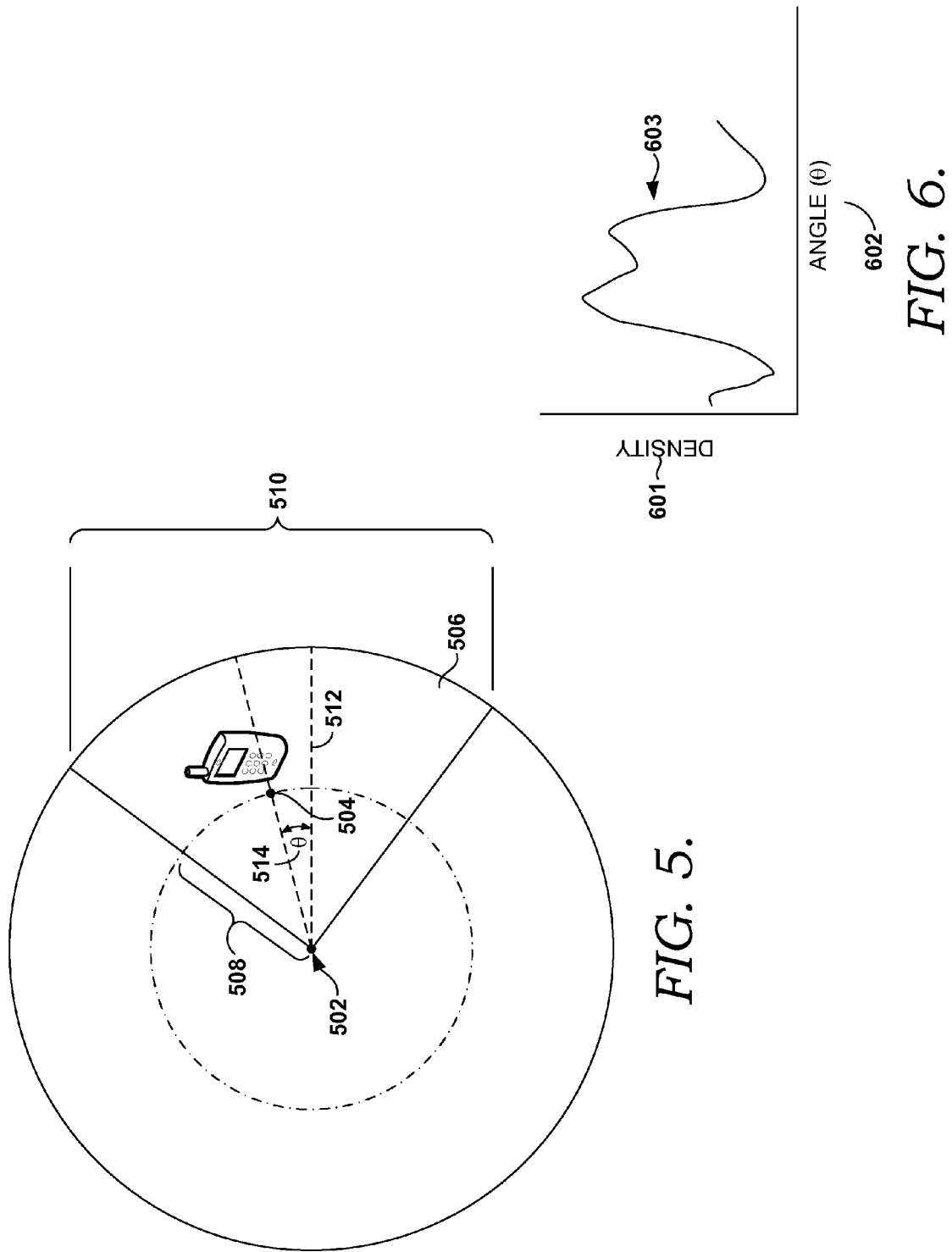

STATISTICAL METHOD FOR DETERMINING THE LOCATION OF A MOBILE DEVICE

CROSS REFERENCE TO RELATED APPLICATIONS

This application, claims the benefit of U.S. Provisional application No. 61/450,910, filed on Mar. 9, 2011, entitled "Statistical Method for Determining the Location of a Mobile-Device," which is incorporated in its entirety by reference herein.

SUMMARY

Embodiments of the invention are defined by the claims below, not this summary. A high-level overview of various aspects of the invention is provided here for that reason, to provide an overview of the disclosure and to introduce a selection of concepts that are further described below. This summary is not intended to identify key features or essential features of the claimed subject matter, nor is it intended to be used as an aid in isolation to determine the scope of the claimed subject matter.

Embodiments of the present invention are related to facilitating a location-based service for use by a mobile-device in a wireless-telecommunications-network. A probability is determined that a base station in the network provides a level of signal coverage to a geographical area that would enable a mobile device in the geographical area to communicate with the wireless-telecommunications-network.

A density of possible locations for the mobile device within the geographical area is determined. A position for the mobile-device is determined based on the density. This position may represent a location estimate for the mobile-device. A location-based service is facilitated for use by the mobile-device based on the position.

BRIEF DESCRIPTION OF THE DRAWINGS

Illustrative embodiments of the present invention are described in detail below with reference to the attached drawing figures, and wherein:

FIGS. 4-5 depict an exemplary base station coverage area, in accordance with an embodiment of the invention;

FIG. 6 depicts an exemplary graph illustrating mobile-device locations, in accordance with an embodiment of the invention.

DETAILED DESCRIPTION

Figure 1:
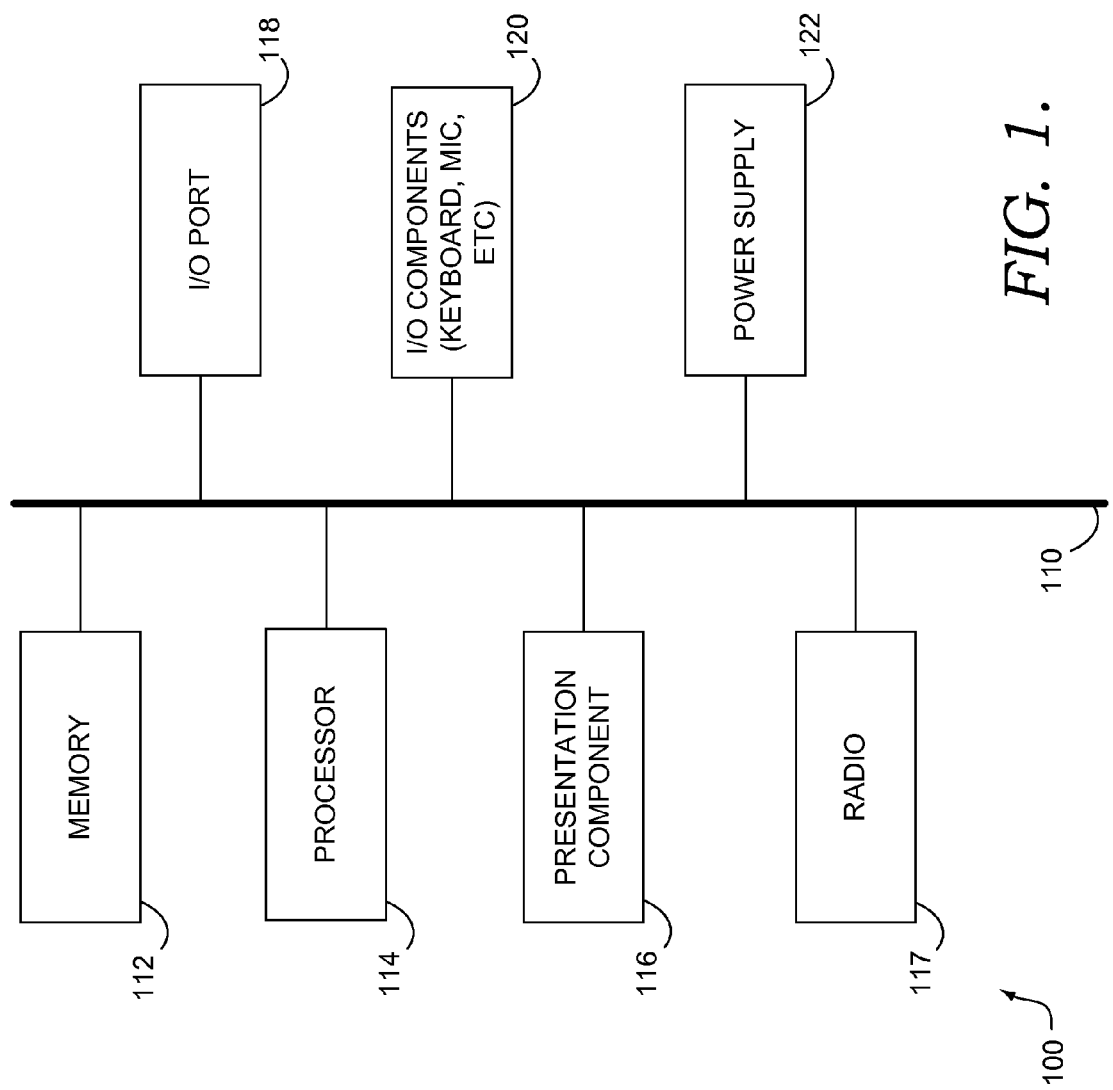
FIG. 1 depicts an illustrative mobile-device suitable for practicing an embodiment of the present invention.

The subject matter of embodiments of the present invention is described with specificity herein to meet statutory requirements. But the description itself is not intended to necessarily limit the scope of the claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the present invention are directed to, among other things, determining a position of a mobile-device by utilizing information captured by call data records. Such information includes a round-trip-time (RTT), which is the time it takes for a signal to travel from a base station to the mobile-device and back to the base station, and signal-to-noise-and-interference ratios (SINRs). The call data records typically log data related to one base station—the base station that is providing signal coverage that covers or carries the communications of the mobile-device.

According to some embodiments of the present invention, the determined position could then be used to facilitate a location-based service for use by the mobile-device. Location-based services could allow users' mobile-devices to leverage position information to support services. These location-based services could include finding points of interest near the user's current position (e.g., closest-business locator) and locating other users of mobile-devices (e.g., family-locator service). Such services provide a new range of incentives to make use of mobile-devices.

Various services may require different levels of accuracy in the location estimate for a given mobile-device. According to an embodiment of the invention, initial location estimations based on connectivity to a particular base station can be improved given further connection information. Wireless networks (e.g., wide-area cellular networks) can be made up of a group of base stations. Each base station can provide signal coverage to a particular geographical area. Areas of coverage may be overlapping, so that two or more base stations may be able to provide signal coverage to a single geographical area. Mobile-devices within such an area can choose a base station for use as a point of connectivity. The choice in base station can be determined by a number of factors, which may result in a base station that is not the geographically closest base station being chosen for use as a point of connection to the network. For example, the base station that is selected may have a SINR above a certain threshold as compared to other base stations within the network.

In choosing a base station as a point of network connection, a number of factors may be involved. A signal strength may be used to determined the best quality connection. Also, as mentioned above, a base station may be randomly selected from a list of base stations whose signal strength or SINR is above a certain threshold. Signal-strength metrics can be used to measure the quality of a signal as perceived at the mobile-device. A number of factors can affect a signal-strength measure. For example, the power used on the link from the base station to the mobile-device can affect a signal-strength metric at the mobile-device. The noise in the environment can also be combined with a measure of signal strength to produce a signal-strength metric called a signal-to-noise ratio (SNR) that can be used to measure the perceived connection or link quality. SINR is a measure of the noise in the environment and the interference due to other radio sources. Signals can also fade as they propagate across a distance. Such fading can affect the link quality. There are many different models suitable for characterizing various different types of fading that occur during signal propagation (e.g., Rayleigh fading).

According to an embodiment of the invention, the position of a mobile-device could be assumed to be the location of the base station itself. This initial assumption could then be corrected based on other information, such as, for example, a distance from the base station to which the mobile-device is connected. Such distances can be estimated based on a number of different factors. By way of example, the RTT of a signal between the base station and the mobile-device could be used as a distance metric. The RTT is an estimate and may be prone to error as shown by comparing the actual distance (as measured, for example, by GPS) from the base station to the mobile-device, to the distance derived from the RTT. The error may be corrected by using a distribution of estimated distances derived from RTTs. In one aspect, the actual distance from the base station to the mobile-device is within the distribution of estimated distances.

The initial assumption that the position of the mobile-device is the base station itself can also be corrected based on information associated with the type of antenna used by the base station. A base station may have an omni-directional antenna which radiates signal power uniformly in one plane, or the base station may have a directional antenna with a specified beamwidth which radiates signal power most effectively in a particular direction known as the azimuth. For base stations with omni-directional antennas, the strength of the signal received by the mobile-device weakens as the distance between the mobile-device and the base station increases; this attenuation is known as a path-loss factor. But for those base stations that have directional antennas, the power received by a mobile-device depends not only on the distance between the base station and the mobile-device, but also on the angle between the azimuth and the mobile-device. For example, at a same distance from a base station, a mobile-device located farther off the azimuth receives less power than a mobile-device located right on or near the azimuth; this attenuation is known as a sectorized path-loss factor or a distance-and-angle path-loss function.

The initial assumption that the position of the mobile-device is the base station itself can be further corrected by using measured SINR information captured by call data records instead of predetermined SINR threshold values. This aspect will be explained in greater depth below.

An additional correction takes in into account "hidden" SINR information. The call data records record all base station sectors that are in the mobile-device's "active set." An active set is the set of base stations that cover or carry the communication of the mobile-device at the time of a call. If the SINR from a base station sector is above a first threshold, the base station is placed in the active set. The fact that only one base station sector is recorded in the call data record indicates that all other neighboring base station sectors have a SINR below a second threshold. The first and second threshold may or may not be the same. The correction takes into account the neighboring base station sectors that have a SINR below the second threshold.

According to a further embodiment of the invention, Bayesian probability theory can be used to predict the most likely position of the mobile-device. Given no probability analysis and a distance from the base station, the location of the mobile-device can be estimated to be somewhere along a circle with the center located at the location of the base station and the radius equal to that of the distance from the base station. To estimate the location on that circle, Bayesian probability theory could be used to determine the density of probable locations for the mobile-device along the circle. Once this density is calculated, the position of the mobile-device could be estimated as the location along the circle with the highest density, according to an embodiment. According to another embodiment, the position could be estimated by sampling locations according to the density function and calculating a mean of those locations. There are other ways that the density function could be used to estimate the position of the mobile-device. By way of example, the density function could be calculated for two-dimensions and involve knowledge of more than one base station.

To calculate a density function assuming an omni-directional antenna, according to an embodiment of the invention, the probability that a particular base station $X_o$ covers a mobile-device at a given area x can be calculated. Equation 2 of Provisional application 61/450,910 is an example of an equation for calculating the probability that the base station provides signal coverage to the mobile-device at area x:

$$\pi X_0(x) = P\left(p_0 F_0 L_0(x) \geq \gamma\left(\sum_{i=1}^{K} p_i F_i L_i(x) + I_X(x) + N(x)\right)\right) \quad (2)$$

(hereinafter equation 2) where p denotes the mean power used on the downlink of base station X, F denotes an exponential random variable representing the fading for base station X to mobile-device x, L denotes a path-loss factor or attenuation factor, $P_i$ denotes the mean total power used on the downlink of base station $X_i$, $F_i$ denotes an exponential random variable representing the fading from base station $X_i$ to x, $I_X(x)$ denotes the power of the interference created at point x by all the other base stations of the set of base stations, and N(x) denotes the thermal noise power at x. This can be rewritten as shown by equation 3 of Provisional application 61/450,910:

$$\pi X_0(x) = \prod_{i=1}^{K} \frac{1}{1 + \gamma \frac{p_1 L_1(x)}{p_0 L_0(x)}} \cdot \Psi_{I_X(x)}\left(\frac{\gamma}{p_0 L_0(x)}\right) \cdot \Psi_{N(x)}\left(\frac{\gamma}{p_0 L_0(x)}\right) \quad (3)$$

where $\psi_{I_X(x)}(S)$ and $\psi_{N(x)}(S)$ are Laplace transforms of $I_x(x)$ and N(x), respectively and λ is an SINR threshold (hereinafter equation 3).

Given the probability $\pi_X(x)$, Bayes's formula can be used to compute the density of probable locations for the mobile-device at area x conditional on the fact that the mobile-device is connected to base station $X_o$, as shown by equation 4 of Provisional application 61/450,910, as follows:

$$\Phi(x) = \frac{\pi_X(x) f(x)}{\int \pi_X(u) f(u) \delta u}, \quad (4)$$

where $f(\cdot)$ is the a priori density of mobile-device locations (hereinafter equation 4).

An embodiment of the invention is directed to facilitating a location-based service for use by a given mobile-device. For a given base station among a set of base stations that make up a portion of a wireless-telecommunications-network, a probability that it provides a level of signal coverage such that a mobile-device in a first geographical area is able to communicate with the network is determined. The angle between an azimuth of the base station and the first geographical area is considered along with a beamwidth of the base station antenna. A density of possible locations of the mobile-device within the first geographical area is determined. A position for the mobile-device is determined based on the density of possible locations. This position represents a location estimate for the mobile-device. A location-based service is facilitated for use by the mobile-device based on the position.

Another embodiment of the invention is directed to determining a position of a given mobile-device. For a given base station among a set of base stations that make up a portion of a wireless-telecommunications-network, a probability that it provides a level of signal coverage such that a mobile-device in a first geographical area is able to communicate with the network is determined. A threshold deviation from a measured SINR, as captured by call data records, is considered in this determination. A density of probable locations for the mobile-device within the first geographical area is determined by using a Bayesian probability. The position of the given mobile-device is determined based on the density of probable locations of the mobile-device.

A further embodiment of the invention is directed to facilitating a location-based service for use by a given mobile-device. For a given base station among a set of base stations that make up a portion of a wireless-telecommunications-network, a probability that it provides a level of signal coverage such that a mobile-device in a first geographical area is able to communicate with the network is determined. This determination is based at least in part on a SINR for the base station and SINRs for a plurality of neighboring base stations in the set of base stations. A density of possible locations of the mobile-device within the first geographical area is determined based on a Bayesian probability conditioned on the mobile-device being covered by the base station. The density determination is also conditioned on a distribution of estimated distances from the mobile-device to the base station. A position of the given mobile-device is determined based on the density. A location-based service is facilitated for use by the mobile-device based on the position of the mobile-device.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Turning now to FIG. 1, a block diagram of an illustrative mobile-device is provided and referenced generally by the numeral 100. Although some components are shown in the singular, they may be plural. For example, mobile-device 100 might include multiple processors or multiple radios, etc. As illustratively shown, mobile-device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile-device 110. Power supply 122 includes items such as batteries, fuel cells, or any other component that can act as a power source to power mobile-device 110.

Figure 2:
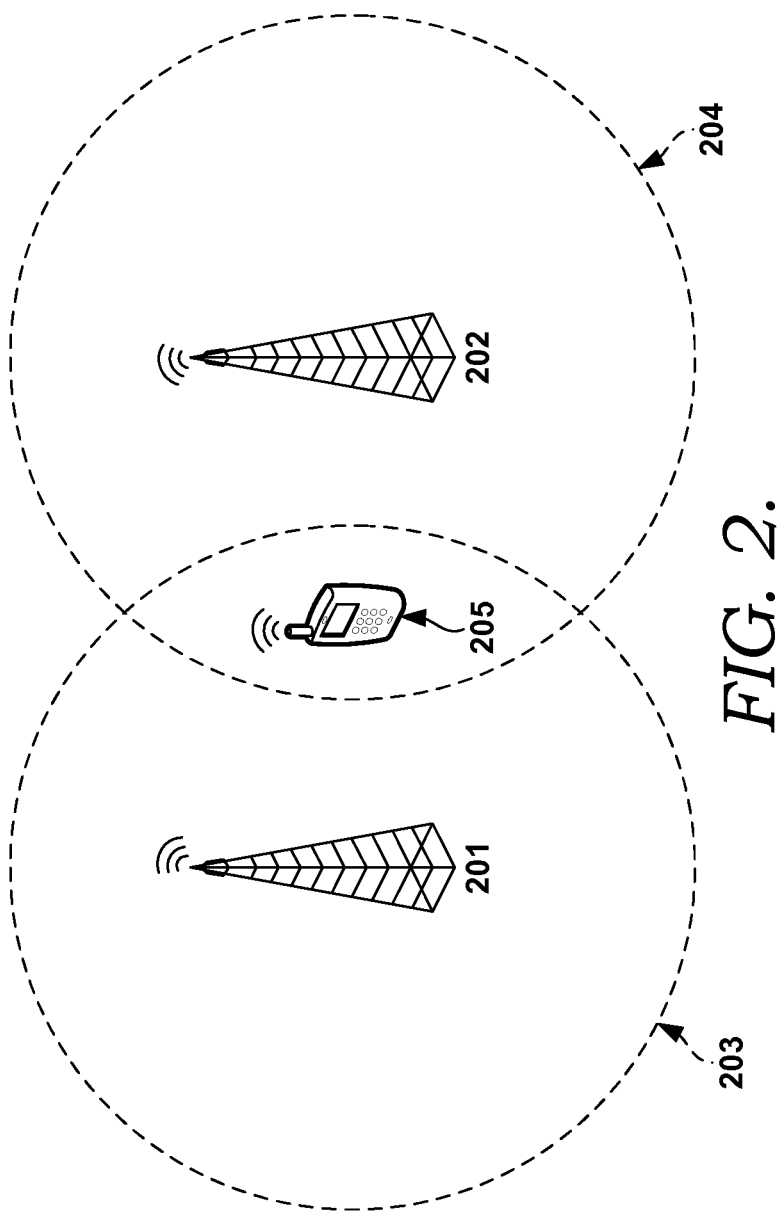
FIG. 2 depicts a diagram of an exemplary network environment suitable for implementing an embodiment of the invention.

Turning now to FIG. 2, a diagram depicting a network environment suitable for implementing the present invention is given. Base stations 201 and 202 provide signal coverage for mobile-devices in a given geographical area. For example, base station 201 has a coverage area defined by circle 203 and base station 202 has a coverage area defined by circle 204. In general, coverage areas are not circular or spherical due to various effects such as signal fading and reflections off terrain obstacles.

There are many other factors affecting signal coverage. Typical adjacent base stations have overlapping signal coverage areas. For example, mobile-device 205 is in the coverage area of both base station 201 and base station 202. In this case, mobile-device 205 could use a number of metrics to choose a particular base station to use for access to network resources. By way of example, a signal-strength or link-quality metric, such as SNR or SINR, could be used to determine which base station to use for connectivity to network resources. For example, as mentioned above, base station 201 may have a SINR above a first threshold, while base station 202 may have a SINR below a second threshold. Both the first and second threshold may be above the needed threshold for connectivity. Because base station 202 has a SINR above that of base station 203, base station 202 will cover or carry the communication of the mobile-device, although the SINR of base station 203 may factor into a probability determination.

Figure 3:
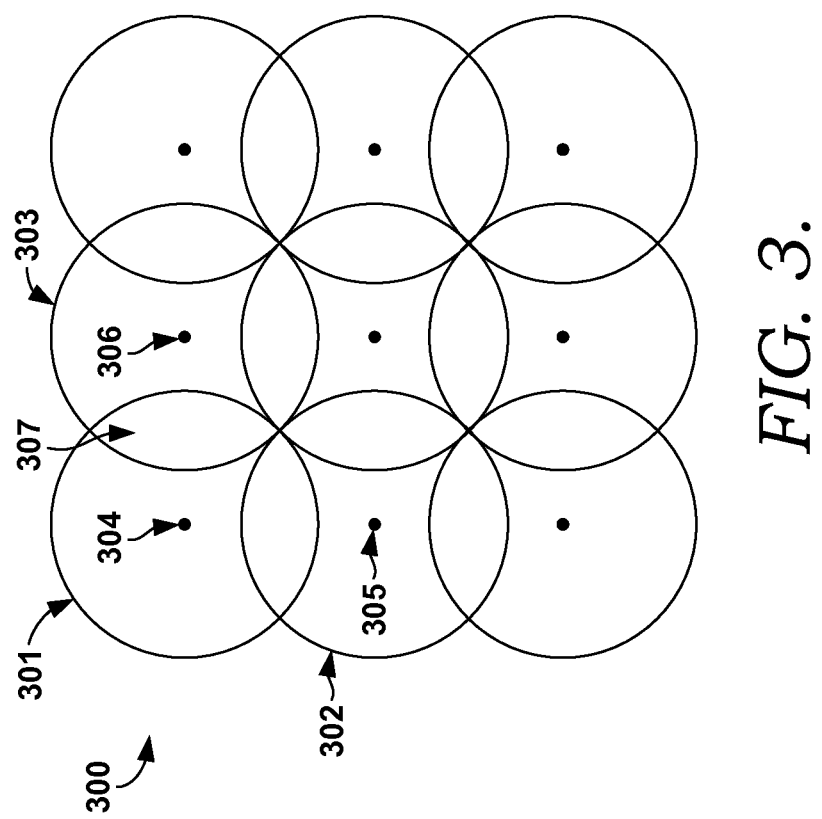
FIG. 3 depicts a diagram of an exemplary wide-area network suitable for implementing an embodiment of the invention.

Turning now to FIG. 3, a wide-area network 300 composed of base stations (e.g., 304, 305, and 306) and the associated coverage areas (e.g., 301, 302, and 303) is depicted. Mobile-devices can travel throughout a network of base stations making up various signal coverage areas. Each base station could have a coverage area that overlaps with one or more other base stations. By way of example, base station 304 has a coverage area 301 overlapping the coverage area 303 of base station 306, the overlap defined by area 307. Many more complex overlapping coverage areas may exist in wide-area networks created by groups of base stations.

Figure 4:
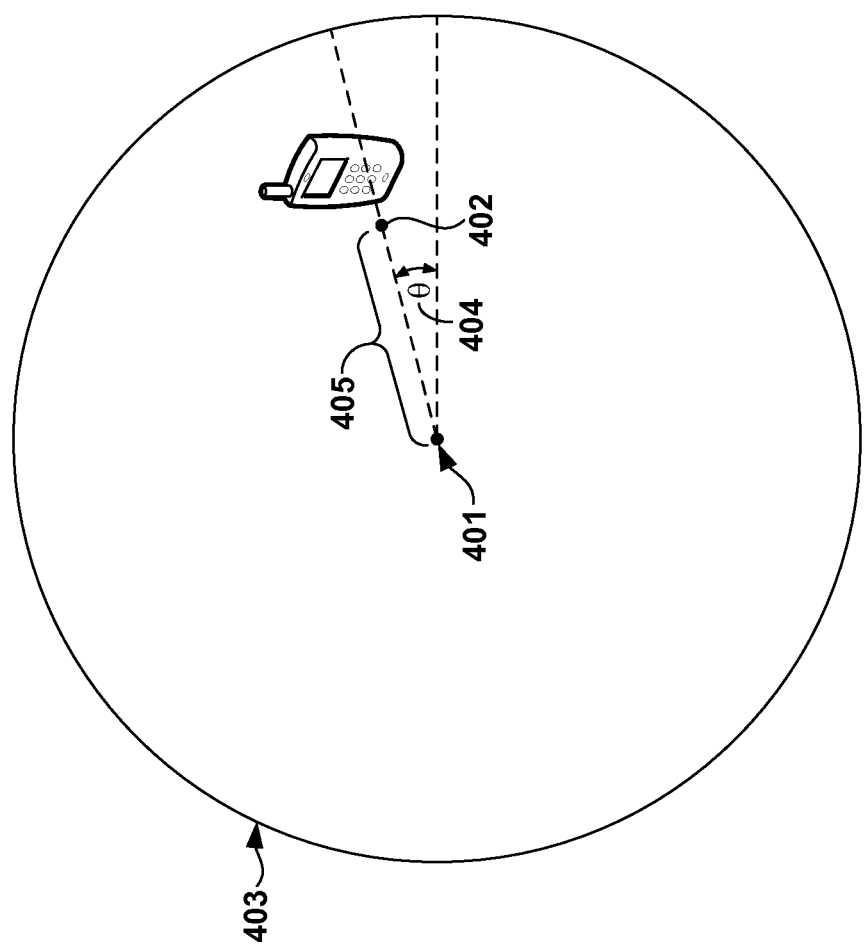

According to an embodiment of the invention based on a base station with an omni-directional antenna, a mobile-device's position can be estimated based at least in part on a distance measure from that base station. A distance measure could be, for example, a round-trip time. Turning to FIG. 4, a base station at 401 could have a coverage area defined by a circle 403. Although radiation patterns typically do not have a perfectly circular pattern, a circle is used in the drawing for the sake of clarity. Given that a mobile-device at 402 is connected to the base station at 401 and that the mobile-device 402 is a distance 405 from the base station at 401, the position of mobile-device 402 could be estimated as somewhere along the circle 403 centered at 401 and with radius 405. An estimation of an angle ($\theta$) 404 could yield a more accurate estimation of the location of the mobile-device 402 as a point on the circle 403 with radius 405. According to an embodiment of the invention, an estimate of the angle ($\theta$) 404 can be performed through the use of a Bayesian-probability-based calculation.

According to another embodiment of the invention based on a base station with a directional antenna, a mobile-device's position can be estimated based on the base station to which it is connected, information about an azimuth of the base station, and a distance measure from the base station. A distance measure could be, for example, a round-trip time. Turning to FIG. 5, a base station 502 with an azimuth 512 could have a coverage area defined by a sector 506 where sector 506 has a width 510. The coverage area is depicted as shown in FIG. 5 for the sake of clarity; in reality, the coverage area may assume various different shapes. Given that a mobile-device at 504 is connected to the base station 502, and the mobile-device 504 is at a distance 508 from the base station 502, the position of the mobile-device 504 could be estimated as somewhere in the sector 506, centered at 502, and with radius 508. An estimation of an angle ($\theta$) 514 could yield a more accurate estimation of the location of the mobile-device 504 as a point on the circle with radius 508. According to an embodiment of the invention, an estimate of the angle ($\theta$) 514 can be performed through the use of a Bayesian-probability-based calculation.

A Bayesian probability function can be used to calculate a density of probable locations of a mobile device within a given geographical area. By way of example, the density could be of probable locations for the mobile-device around a circle of a particular radius centered on a base station. Referring to FIG. 6, an exemplary graph of possible locations of a mobile-device around a circle with a particular radius is given. The y-axis 601 shows the density of possible locations for the mobile-device, and the x-axis 602 shows particular angles around the circle. The maxima in the curve 603 could be used to estimate the angle around the circle with a particular radius at which a mobile-device is most likely located. In one aspect, the maxima in the curve 603 represents the most probable locations of the mobile-device within the given geographical area. In yet another aspect, a position of the mobile-device is approximated by sampling a set of probable locations according to the density function and calculating an arithmetic mean of those locations.

Figure 7:
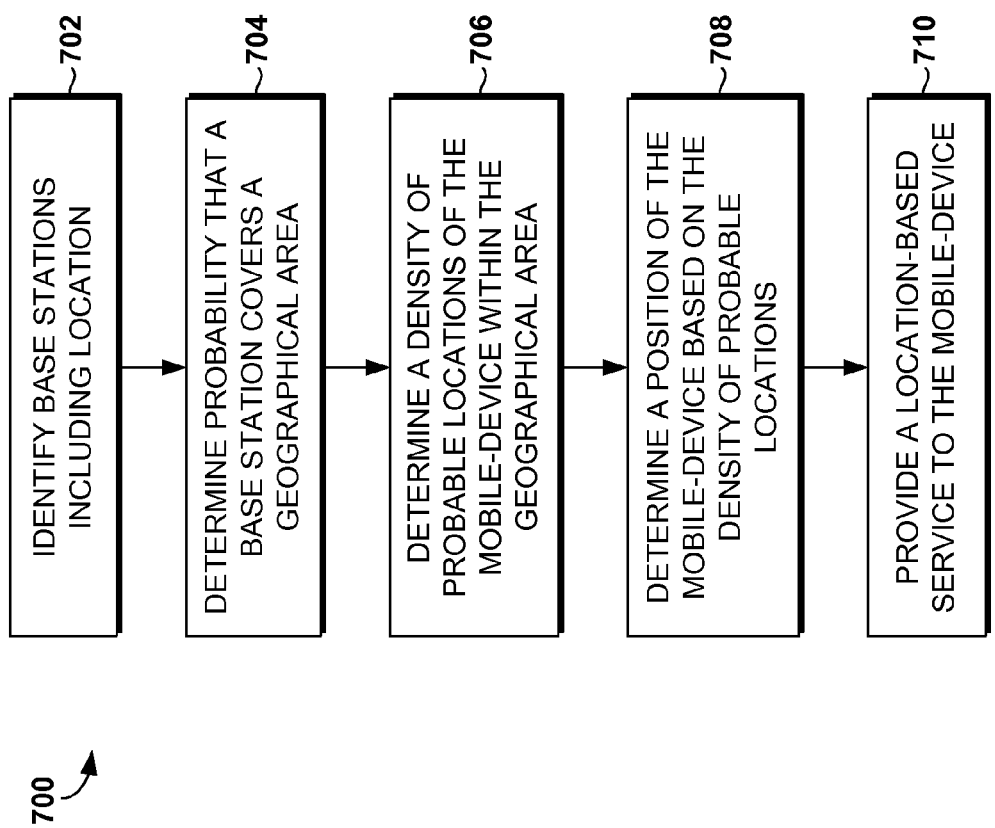
FIG. 7 is a flow diagram showing a method of determining a position of a mobile-device, in accordance with an embodiment of the invention.

Turning to FIG. 7, a flow diagram depicting a method 700 of facilitating a location-based service is given. A list of base stations, including a location of each of the base stations is identified, as shown at a step 702. The list of base stations could be identified from a preconfigured network map. The list of base stations with locations could also be derived using an active base station localization algorithm.

At a step 704, a probability that a base station within a given set of base stations covers a first geographical area is determined. According to an embodiment of the invention, the probability is determined considering an angle between an azimuth of the base station and the first geographical area, the base station antenna having a defined beamwidth. For example, equations 7 and 8 of Provisional application 61/450,910 (hereinafter equations 7 and 8) take this factor into consideration:

$$L(\chi, X_0, \theta_0) = l(\|\chi - X_0\|) G(arg(\chi - X_0) - \theta_0), \quad (7)$$

where, $$G(\theta) = \left| \frac{\sin(\omega\theta)}{\omega\theta} \right|, \ |\theta| \leq \pi, \quad (8)$$

Equation 7 is a sectorized path-loss function (also known as a distance-and-angle combined path-loss function) which takes into account not only the decrease in signal as the distance from the mobile-device to the base station increases, l, but also the decrease in signal as the mobile-device moves further away from the azimuth. It is to be understood that the distance-based path-loss factor, l, in equation 7 corresponds to the distance-based path-loss factor, L, of Equation 2. Equation 8 is a normalized radiation pattern. By replacing the path-loss function in equation 2 with the sectorized path-loss function of equation 7, the probability that the base station covers a given geographical area can be extended to include sector information.

The probability could also depend on a signal-to-noise ratio (SNR) threshold. For example, the SNR threshold could be used to determine a point at which a base station has no probability of covering a location. According to another embodiment, the probability could be calculated as a function of a number of factors, including: a fading factor; a noise factor; a downlink power factor; a total downlink power factor, which could be the downlink power from other base stations; and an interference factor. There are other methods that could be used to calculate the probability that a base station covers a mobile-device at a given location in accordance with the invention.

Again with respect to step 704, according to another embodiment of the invention, a probability is determined for a base station to cover a mobile-device at a first geographical area assuming that coverage happens when the SINR of the base station is more than a set SINR threshold. In another aspect, a measured SINR captured by call data records is considered instead of the set SINR threshold. The measured SINR may be assumed to fall within a threshold deviation or confidence interval given by $\hat{\gamma} \pm \epsilon$, where $\hat{\gamma}$ is the recorded SINR and $\epsilon$ is a small value that takes into account any error. In one aspect of the invention, the probability that a base station covering a mobile-device at a first geographical area has a SINR value in the range of $(\hat{\gamma} - \epsilon, \hat{\gamma} + \epsilon)$, can be calculated as shown in equation 9 of Provisional application 61/450,910 (hereinafter equation 9) as follows:

$$\pi(\theta) = \pi_{\hat{\gamma} - \epsilon}(\theta) - \pi_{\hat{\gamma} + \epsilon}(\theta) \quad (9)$$

To illustrate this further and referring back to equation 2, γ is replaced by (γ−ϵ) and (γ+ϵ) to calculate the probability that the base station covering the mobile-device at the first geographical area has a SINR value in the specified range ($\hat{\gamma} - \epsilon$, $\hat{\gamma} + \epsilon$).

In still another aspect with respect to step 704, a probability that a base station with an omni-directional antenna provides a level of signal coverage to a first geographical area that would enable a mobile device in the first geographical area to communicate with a wireless-telecommunications-network can be determined based in part on a SINR for the base station, where the base station is in a given set of base stations, and the SINRs for neighboring base stations in the given set of base stations. This is known as the "hidden" SINR factor. Neighboring base stations can be defined as those base stations that have a SINR above a set minimum threshold. In other words, the neighboring base stations have the potential to cover the mobile-device but are not actually carrying the communication. In this aspect, a probability that a base station with a SINR above a first threshold, γ, covers the mobile-device is determined along with a probability that neighboring base stations do not cover the mobile-device because their SINRs are below a second threshold, v. This is shown by equations 10 and 11 of Provisional application 61/450,910 (hereinafter equations 10 and 11) as follows:

$$P\left(p_0 F_0 L_0(x) > \gamma\left(\sum_{i=1}^{K} p_i F_i L_i(x) + C(x)\right),\right.$$

$$\left.\bigcap_{j=1}^{K} p_j F_j L_j(x) < v\left(\sum_{i=0, i \neq j}^{K} p_i F_i L_i(x) + C(x)\right)\right).$$

Where $L_i(x)$ denotes the path-loss factor at location x from base station $X_i$. Therefore, $$P\left(P_0 F_0 L_0(x) > \max\left(\gamma\left(\sum_{i=1}^{K} p_i F_i L_i(x) + C(x)\right),\right.\right.$$

$$\left.\left.\bigvee_{j=1}^{K}\left(\frac{p_j F_j L_j(x)}{v} - \sum_{i=1, i \neq j}^{K} p_i F_i L_i(x) - C(x)\right)\right)\right).$$

Since the $F_i$'s are exponential and independent, the following expression is deduced:

$$\pi X_0, \overline{X}_1, \ldots, \overline{X}_K(x) = \int_{a>0}\int_{t_1>0}\ldots\int_{t_K>0} \tag{10}$$

$$e^{-\frac{g(x,t_1,\ldots,t_K,a)}{p_0 L_0(x)}} e^{-t_1} \ldots e^{-t_K} dt_1 \ldots dt_K f_x(a) da,$$

where $f_\chi$ denotes the density of $C(\chi)$ and $$g(x, t_1, \ldots, t_K, a) = \tag{11}$$

$$\max\left(\gamma\left(\sum_{i=1}^{K} p_i t_i L_i(x) + a\right), \bigvee_{j=1}^{K}\left(\frac{p_j t_j L_j(x)}{v} - \sum_{i=1, i \neq j}^{K} p_i t_i L_i(x) - a\right)\right).$$

Where $C(x)$ denotes the sum of the thermal noise and interference from non-neighboring base stations at x.

A density of possible locations that a mobile-device may be within the first geographical area is determined, as shown at a step 706. According to an embodiment of the invention, Bayes's formula (equation 4) could be used to calculate the density conditioned on the fact that the mobile-device is covered by the base station. For example, Bayes's formula in combination with the probability that a given base station covers a mobile-device at a given location, distance, and angle from the base station could be used to calculate a density. As another example, the density could be calculated with the probability that a base station covers a mobile-device at a particular area without a distance from the base station. In another aspect, with respect to a base station with an omni-directional antenna, the density could be determined using a distribution of estimated distances derived from RTTs where the actual distance is within the distribution of estimated distances. This is shown in equation 12 of Provisional application 61/450,910 as shown below, where $f_r$ is the distribution of distances function:

$$\phi(u, \theta) = \frac{\pi X_0(u_1 \theta) f_r(u)}{\int_{v=0}^{\infty}\int_{\alpha=0}^{2\pi} \pi X_0(v, \alpha) f_r(v) dv d\alpha}. \tag{12}$$

A position of the mobile-device is determined, as shown at a step 708. A position could be determined by taking a previous location estimate of the mobile-device and modifying it using distance information and the density determined from the Bayesian probability.

In another aspect, the position of the mobile-device could be determined based on a maxima of the density. As yet another example, a set of locations corresponding to the density could be sampled and an arithmetic mean of these locations could be calculated to approximate a position for the mobile-device.

Turning back to FIG. 7, a location-based service is provided to the mobile-device, as shown at a step 710. A location-based service could be provided by facilitating a location-based service operating at a computing device connected to the network by providing the determined position to the location-based service. As another example, the location-based service could be provided by giving the determined position to a location-based service operating on the mobile-device. There are many ways to provide location-based services, including facilitating the location-based services by providing a location estimation of the position of one or more mobile-devices.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, enable a computing device to perform a method of facilitating a location-based service for use by a mobile-device, the method comprising:

among a set of base stations that make up a portion of a wireless-telecommunications-network, wherein a location of each base station in the set is known, and wherein each base station has a signal-to-noise-and-interference ratio (SINR) above a predetermined minimum SINR such that each base station provides signal coverage to a first geographical area such that a mobile-device in the first geographical area is capable of communicating with the telecommunications-network via the each base station;

for a first base station in the set, the first base station having a directional antenna, considering a.) an angle between an azimuth of the first base station and the first geographical area, and b.) a beamwidth of the directional antenna of the first base station, determining a joint probability that the SINR of the first base station is greater than a first threshold SINR above the predetermined minimum SINR and the SINRs from neighboring base stations within the set of base stations are less than a second threshold SINR above the predetermined minimum SINR such that the first base station provides a level of signal coverage to the first geographical area that would enable a first mobile-device in the first geographical area to communicate with the wireless-telecommunications-network;

determining a density of possible locations that the first mobile-device may be within the first geographical area, the density based on a Bayesian probability conditioned on the first mobile device being covered by the first base station;

approximating a position of the first mobile-device based on the density of possible locations; and facilitating the location-based service for use by the first mobile-device based on the position.

2. The Non-transitory computer-readable media of claim 1, wherein the density is based at least in part on a distribution of estimated distances from the first mobile-device to the first base station, the estimated distances derived from the time it takes for a signal to pass from the first base station to the first mobile-device and back to the first base station.

3. The Non-transitory computer-readable media of claim 2, wherein an actual distance from the first mobile-device to the first base station is within the distribution of estimated distances.

4. The media of claim 1, wherein the location-based service is a closest-business locator service.

5. The Non-transitory computer-readable media of claim 1, wherein the probability is further determined as a function of factors including one or more of a fading factor, a noise factor, a downlink power factor, a total downlink power factor, and an interference factor.

6. The Non-transitory computer-readable media of claim 1, wherein the position of the first mobile-device is further approximated based on a maxima of the density of possible locations, wherein the maxima of the density of possible location indicates a set of probable locations based on the density.

7. The Non-transitory computer-readable media of claim 6, wherein the position of the first mobile-device is further approximated by calculating an arithmetic mean of the set of probable locations.

8. Non-transitory computer-readable media having computer-executable instructions embodied thereon that, when executed, enable a computing device to perform a method of facilitating a location-based service for use by a mobile-device, the method comprising:

among a set of base stations that make up a portion of a wireless-telecommunications-network, wherein a location of each base station in the set is known, and wherein each base station has a signal-to-noise-and-interference ratio (SINR) above a predetermined minimum SINR such that each base station provides signal coverage over a first geographical area such that a mobile-device in the first geographical area is capable of communicating with the telecommunications-network via the each base station;

for a first base station in the set, the first base station having an omni-directional antenna, determining a joint probability that the SINR of the first base station is greater than a first threshold SINR above the predetermined minimum SINR and the SINRs from neighboring base stations within the set of base stations are less than a second threshold SINR above the predetermined minimum SINR such that the first base station is providing a level of signal coverage to the first geographical area that would enable a first mobile-device in the first geographical area to communicate with the wireless-telecommunications-network;

determining a density of possible locations that the first mobile-device may be within the first geographical area, the density based on a Bayesian probability conditioned on the first mobile-device being covered by the first base station, and further wherein the density is based at least in part on a distribution of estimated distances from the first mobile-device to the first base station;

based on the density, approximating a position of the first mobile-device; and facilitating the location-based service for use by the first mobile-device based on the position.

9. The Non-transitory computer-readable media of claim 8, wherein the probability is further determined as a function of factors including one or more of a fading factor, a noise factor, a downlink power factor, a total downlink power factor, an interference factor, and a path-loss factor.

10. The Non-transitory computer-readable media of claim 8, wherein the facilitating includes providing the position to a location-based service operating on the first mobile-device.

* * * * *